March 22, 1932.    A. O. SCHAEFER    1,850,478
SAW
Original Filed Nov. 6, 1930
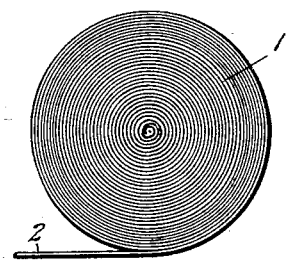
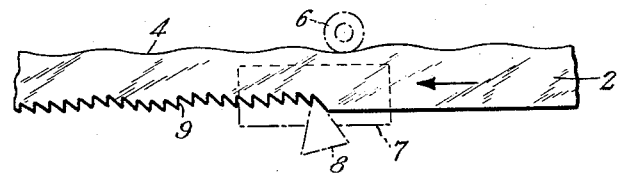
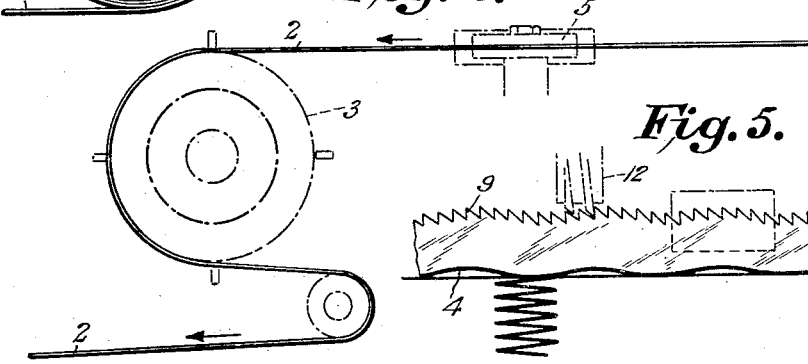
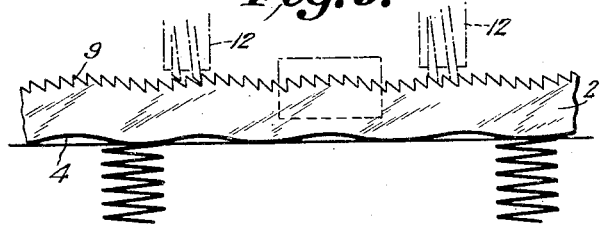
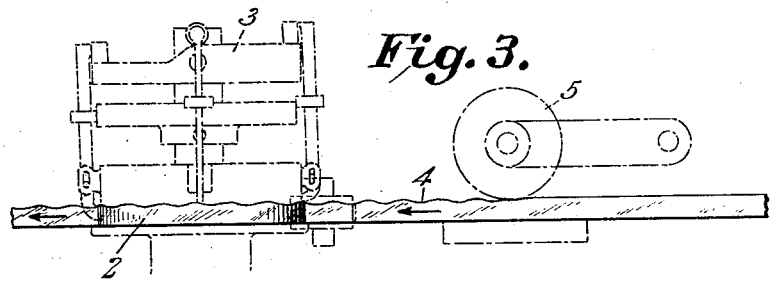
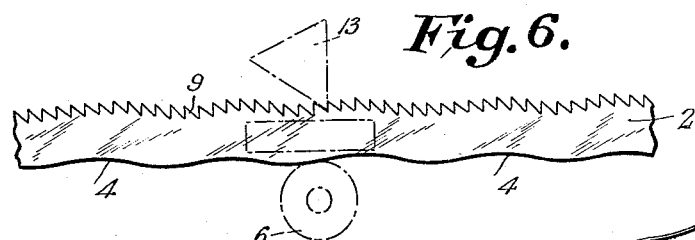
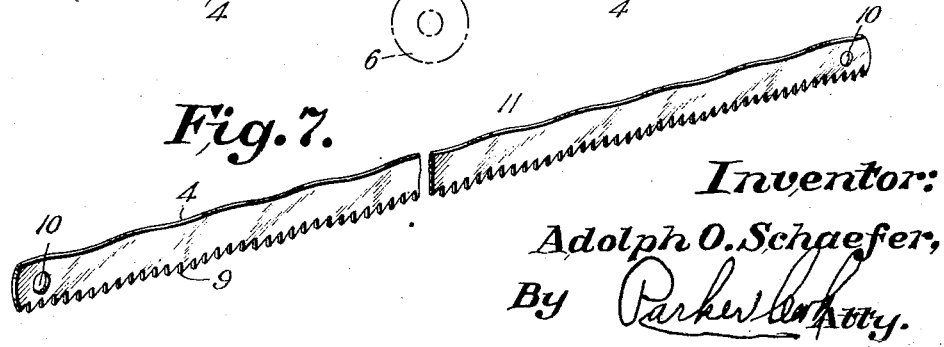
Inventor:
Adolph O. Schaefer,
By Parker Atty.

Patented Mar. 22, 1932

1,850,478

UNITED STATES PATENT OFFICE

ADOLPH O. SCHAEFER, OF BROOKLYN, NEW YORK, ASSIGNOR TO ATLANTIC SERVICE COMPANY, INC., OF BROOKLYN, NEW YORK, A CORPORATION OF NEW YORK

SAW

Original application filed November 6, 1930, Serial No. 493,860. Divided and this application filed June 18, 1931. Serial No. 545,314.

My invention relates to new and useful improvements in saws, and more particularly to a saw which is to be used in the meat industry, such as for cutting animal carcasses.

The present application is a division of an application filed by me on the 6th day of November, 1930, Serial Number 493,860, for saws and the method of making the same.

One of the principal objects of the invention is to provide a saw with a wave line in the teeth and also to so construct the saw that the same wave line will always be retained, no matter how often the saw is sharpened.

As is well known to those skilled in the art, saws have been provided with a wave line in their teeth, but many difficulties are encountered when the saw is to be refiled and resharpened, as there is no practical means for guiding the saw through a filing machine which will cause the refiling action to accurately follow the original wave line of the saw.

A further object of the invention is to provide a wave line in the teeth and to provide a similar form of wave line on the rear edge of the saw, so that after the saw is made and sent back for refiling, the rear edge of the same acts as a standard or gauge and the refiling will be duplicated on each toothed edge and this will happen no matter how often the blade is refiled.

Still another object of the invention is to provide a saw of the narrow band type which may be cut from stock in any desired lengths and wherein as the saw is being initially made, the ribbon or stock may be passed through a machine, which will accurately form the gauge or wave line on the back, and this wave line will also act as a true guide for the stamping or cutting of the teeth and for the filing of the teeth.

Still another object of the invention is to utilize a roll of thin metal ribbon stock which is formed with the wave or gauge on its rear surface and with a corresponding wave or pitch line for the teeth, this being carried out for the length of the ribbon. The ribbon stock thus formed may then be cut off into any desired lengths to thus provide saws which may be again accurately sharpened and refiled when necessary.

With these and other objects in view, the invention consists in certain new and novel arrangements and combination of parts, as will be hereinafter more fully explained and pointed out in the claims.

Referring now to the drawings showing a preferred embodiment,

Fig. 1 is a view of the raw stock;

Fig. 2 is a diagrammatic view showing the ribbon of stock as having a wave line or guide formed in its rear surface;

Fig. 3 is a view similar to Fig. 2 and showing diagrammatically the means for advancing and grinding the wave line in the rear of the ribbon stock;

Fig. 4 is a fragmentary view of the ribbon stock showing the teeth being punched therein;

Fig. 5 is a fragmentary view showing the setting of the teeth;

Fig. 6 is a fragmentary view showing the teeth being filed;

Fig. 7 is a view of a piece of the ribbon cut into the desired saw lengths.

Referring now more particularly to the drawings, there is shown in Fig. 1 a roll 1 of the thin metal ribbon stock 2 out of which the saws are to be made. This ribbon is then fed on a drum, diagrammatically shown at 3, and is ground with the wave or gauge 4 by a grinding wheel 5 also diagrammatically shown.

The depth of the wave, that is, the distance from the crest to the bottom of the valley, is preferably substantially sixteen-thousandths of an inch (.016).

In Fig. 3, the wave 4 may be seen during its formation, and it will be understood that the up and down movement of the wheel 5 is synchronized with the movement of the drum 3, so that the ribbon feeds a predetermined amount between each contact of the grinding wheel with the rear edge of the ribbon.

As diagrammatically shown in Fig. 4, a roller 6 is used to correctly position the stock 2 on a die 7, so that the punch 8 may form the teeth 9 in a wave-line corresponding exactly to the wave-line 4 on the rear edge of the ribbon. It will be noticed that the wave of the teeth is identical in pitch and parallel with the corresponding wave on the back or upper edge of the ribbon. It is also to be noticed that the same type of saw tooth is formed throughout the length of the ribbon or stock nor is the form of the tooth in any way changed.

It will be understood, of course, that the same measurement is maintained in the toothed edge as that of the wave on the back or upper edge of the ribbon and that the valley in the rear edge is exactly opposite the crest in the toothed edge, which theoretically creates two wave lines, which are equi-distant apart at every point.

It will also be understood that the size of the teeth may be nine to an inch, ten to an inch and twelve to an inch, the linear pitch of the wave remaining the same independent of the size of the teeth. In other words, if the size of the teeth were diminished until they became so small that they could not be seen, the toothed edge would finally resolve itself into a waved line, exactly like the back edge of the blade.

In Fig. 5, there is diagrammatically shown one manner of passing the saw through the setting hammer and anvil, although it is to be understood that a roller similar to the roller 6 might be used. The spirals 12 act as height gauges and guide the saw in relation to the anvil by means of the waved teeth. However, it is to be understood that the wave back is the gauge and the feed of the blade may be accomplished by a pawl or spiral or in any other manner.

I have also shown fragmentarily in Fig. 6 a part of the stock 2 with its wave line 4 acting as a gauge for the filing of the teeth when the saw is being constructed, the file 13 being diagrammatically shown. It will be understood that after the saw is so formed, it may be cut in any desired lengths 11, as shown in Fig. 7. Holes 10 may be formed at the opposite ends of the saw.

The pitch or wave which I have found to be most desirable is three-quarters of an inch or, in other words, three-quarters of an inch from crest to crest. Thus, four feet of steel stock or ribbon would contain exactly sixty-four waves.

It will be understood that the measurements set out for the wave depth are the ones that have so far given the most satisfactory service, but I do not wish to be limited to the exact fractional part stated, as a depth slightly greater or slightly less might prove just as effective.

There are a good many advantages in forming the ribbon stock in the manner above described, as any desired length of saw may be cut from the ribbon. It will also be seen that by forming the true guide or wave line in the rear edge of the ribbon stock the teeth may be accurately cut and set and also the filing operation, as well as a refiling operation, will be accurately performed.

It is but a very simple matter to refile or resharpen the saw after it has become dull from use, as the wave line at the rear will act as a gauge and it is to be remembered that it was with this standard wave line or guage that the teeth were originally punched, set and filed, and this wave line or gauge will thus always remain during the life of the saw.

Finally, it will be seen that there is no increase in file pressure at the high point in the toothed wave, which has been a difficulty encountered when filing wave-like teeth in the saw of conventional design.

I am aware that it is old to form a saw blade with a reversing swell between the ends and the middle of the sawing edge, but I am not aware of a saw cut from long ribbon stock which has been formed with a wave line or gauge on its rear edge, which gauge is used in the stamping of the teeth, the setting, filing and refiling of the same, and wherein the teeth are formed with a corresponding pitch line.

Lastly, the ribbon may be cut off in any desired lengths from the long ribbon stock and holes drilled at the opposite ends, so that it is then completed and ready for the saw frame.

It will also be understood that the pitch of the wave line and teeth are slightly exaggerated in the drawings for the sake of clearness of illustration.

Having thus described my invention, what I claim as new and desire to secure by Letters Patent is:—

A saw for meat cutting comprising a narrow steel band cut to the desired length, one edge of the band having a wave thereon of substantially three-quarters of an inch from crest to crest and having a depth from trough to crest of substantially sixteen-thousandths of an inch (.016), the lower edge of the band being toothed, the teeth being arranged also in a wave of the same length and depth and the crests and troughs of each wave of the toothed edge properly corresponding with the crests and troughs in the waves of the upper edge of the saw, the number of the teeth being substantially nine to twelve to the inch, and the linear pitch of the wave remaining the same independent of the number of the teeth.

In testimony whereof I affix my signature.

ADOLPH O. SCHAEFER.